(No Model.)

W. A. WOODWARD.
DENTAL MATRIX.

No. 368,042. Patented Aug. 9, 1887.

WITNESSES:
Arthur Murphy
Edw. E. Thomas

INVENTOR
William A. Woodward

UNITED STATES PATENT OFFICE.

WILLIAM A. WOODWARD, OF NEW YORK, N. Y.

DENTAL MATRIX.

SPECIFICATION forming part of Letters Patent No. 368,042, dated August 9, 1887.

Application filed March 18, 1887. Serial No. 231,369. (No model.)

*To all whom it may concern:*

Be it known that I, WILLIAM A. WOODWARD, a citizen of the United States, residing at New York, in the county of New York and State of New York, have invented a new and useful Dental Matrix, of which the following is a specification.

My invention relates to improvements in dental matrices in which the matrix is securely held between two teeth, so that a cavity may be filled with gold or other suitable material; and the objects of my improvements are, first, to enable the adjustment to be made in a shorter time than is now customary; second, to provide a matrix that can be easily adapted to variously-shaped teeth, and, third, to provide a matrix that can be firmly secured between the teeth while gold or other material suitable for filling teeth is introduced into the cavity. I attain these objects by the mechanism illustrated in the accompanying drawings, in which—

Figure 1:
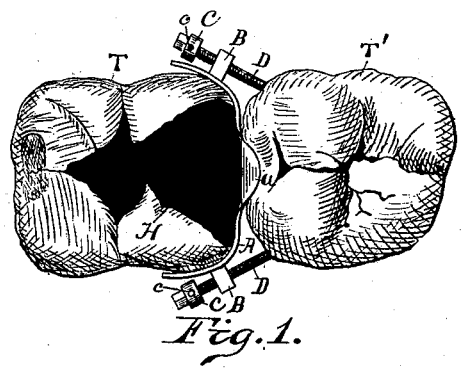
Figure 2:
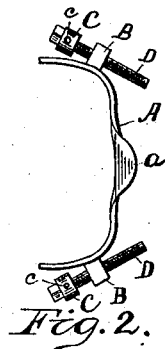
Figure 3:
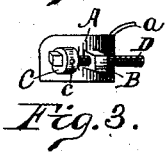

Figure 1 is a plan view of two teeth with the dental matrix attached. Fig. 2 is a plan view of the dental matrix, and Fig. 3 is a side view of the dental matrix shown in Fig. 2.

Similar letters refer to similar parts throughout the several views.

The matrix A is made of metal or other suitable material. It may be of any desirable size and thickness. The matrix shown in the drawings has a lip or projection, $a$, which rests on the tooth T'. The posts B are secured to the matrix A. There may be two of these posts B, as shown in Figs. 1 and 2, or any desired number. These posts B have threaded holes in them, and through these threaded holes pass the screws D. The screws D have on them the heads C, in which are drilled the holes $e$. The screw-head C is of such a shape that it may be turned with a key or suitable wrench; or it may be turned by means of a suitable instrument inserted in one of the holes $c$, which are drilled in the screw-head C. The posts B may be at any points on the matrix A, and the screws D may be set at any angle to the matrix A, provided that they engage the tooth T'. The tooth T' is next to the tooth T, and in the tooth T is shown the cavity H, with the matrix A forming one side of the cavity to be filled. The posts B and the screw D may be placed so as to be a wedge between the tooth T' and the matrix A; or, as shown in Fig. 1, it may rest against the tooth T' and force the matrix against the tooth T. The operation of the dental matrix is shown very fully in Fig. 1. The matrix A is placed between the teeth T and T'. The cavity H in the tooth T is to be filled with gold or other suitable material. The matrix A is made firm in its position by tightening up the screws D. The cavity may then be filled and the matrix A removed.

Having fully described my invention, what I desire to claim and secure by Letters Patent is—

In combination, a matrix which covers the approximal surface of the tooth, one or more posts upon said matrix, and screws passing through orifices in said posts and capable of being pressed against the contiguous tooth or between the contiguous tooth and the matrix.

WILLIAM A. WOODWARD.

Witnesses:
ARTHUR MURPHY,
GEO. SCHLEY.